Dec. 24, 1946.　　　P. B. WITMER　　　2,413,160
POTATO SLICER
Filed March 9, 1945　　　2 Sheets-Sheet 1
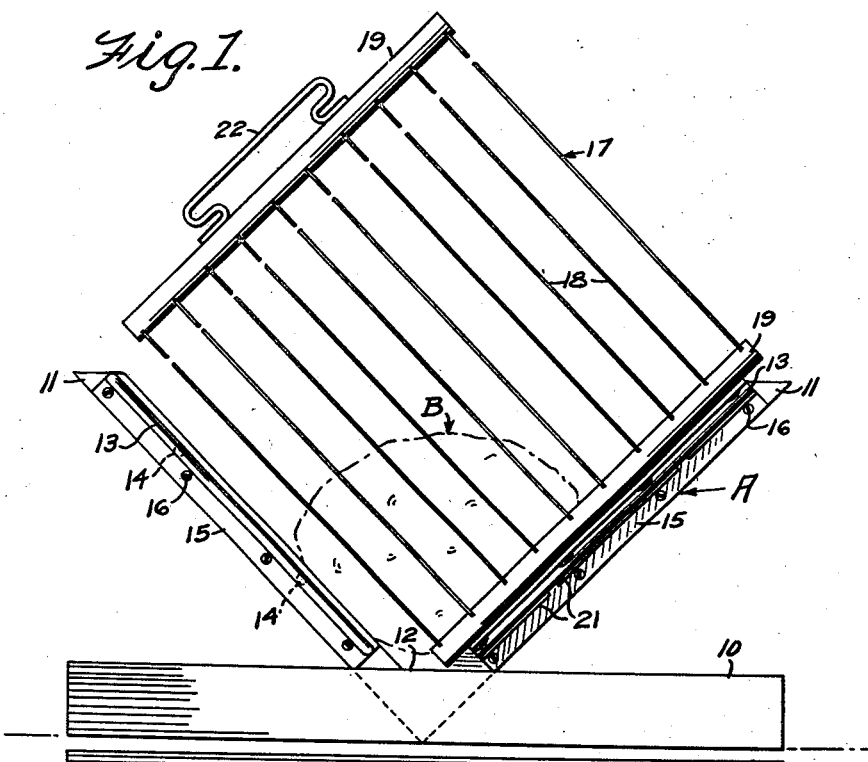
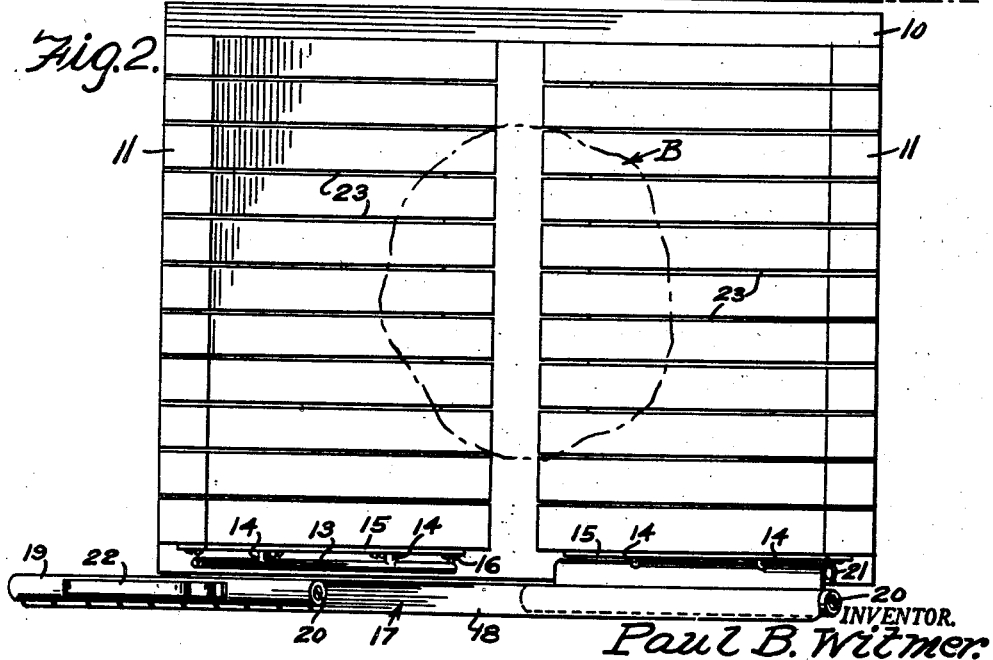
INVENTOR.
Paul B. Witmer
BY
Victor J. Evans & Co.
ATTORNEYS Dec. 24, 1946.           P. B. WITMER                2,413,160
                         POTATO SLICER
                      Filed March 9, 1945           2 Sheets-Sheet 2
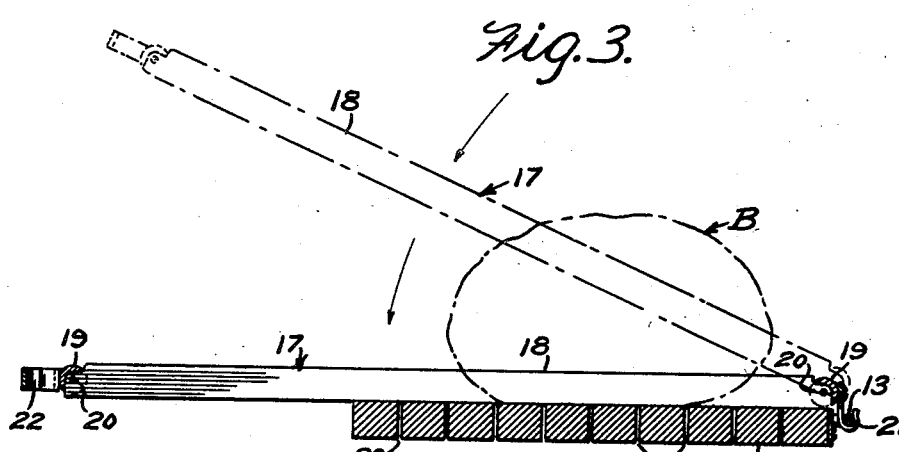
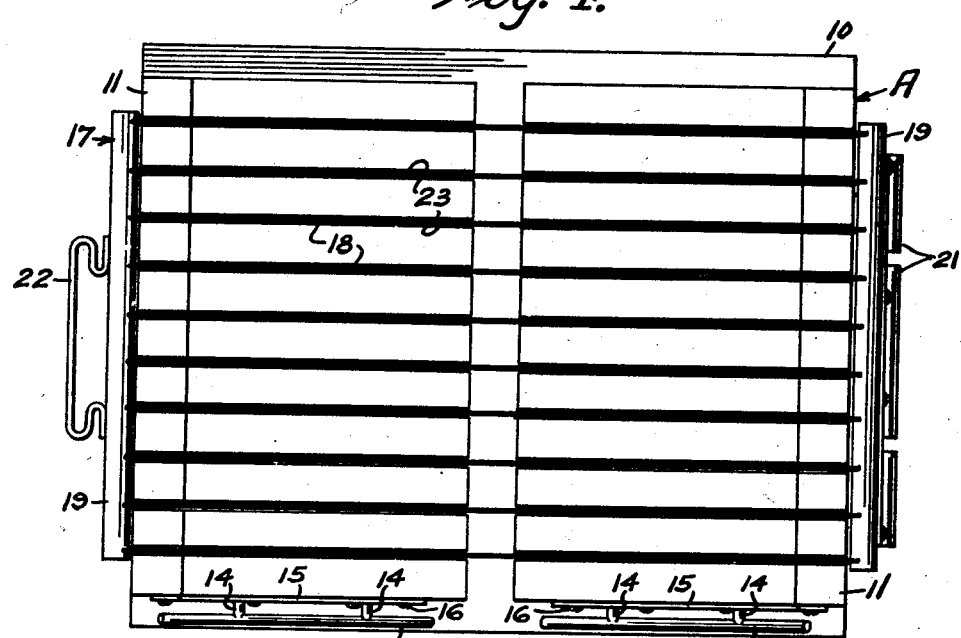
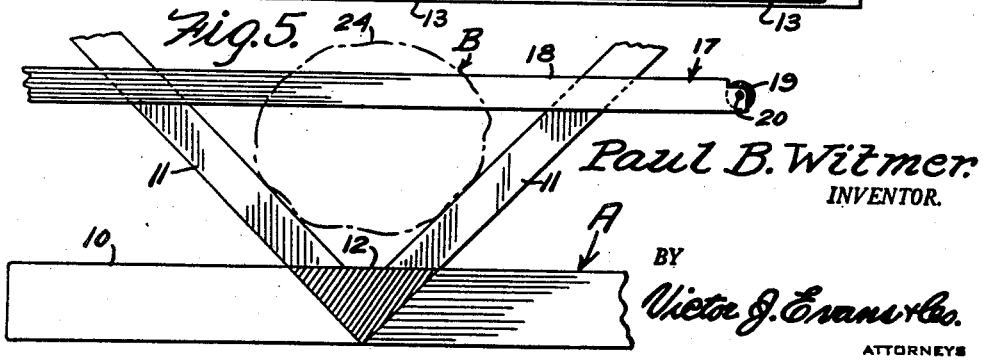
Paul B. Witmer.
INVENTOR.
BY
Victor J. Evans & Co.
ATTORNEYS Patented Dec. 24, 1946

2,413,160

UNITED STATES PATENT OFFICE 2,413,160

POTATO SLICER

Paul Baker Witmer, Lancaster, Pa.

Application March 9, 1945, Serial No. 581,877

2 Claims. (Cl. 146—147)

The invention relates to a slicing machine, and more especially to a vegetable slicer, as for example potatoes.

The primary object of the invention is the provision of a slicer of this character, wherein whole potatoes can be placed therein for cutting the same into strips or for dicing such potatoes into cubes, to enable the French or otherwise frying thereof, the slicer being a convenient and most useful kitchen article, as it relieves a difficult and hazardous task in preparing food for the cooking thereof.

Another object of the invention is the provision of a slicer of this character, wherein the cutting of the hand or fingers during the working thereof will be avoided, the whole vegetable being sliced with dispatch and the parts thereof uniformly cut without the use of a hand knife.

A further object of the invention is the provision of a slicer of this character, which is simple in construction, thoroughly reliable and efficient in operation, strong, durable, readily and easily handled, assures the saving of time for such work, affording a handy kitchen article, and inexpensive to manufacture.

With these and other objects in view the invention consists in the features of construction, combination and arrangement of parts as will be hereinafter more fully described, illustrated in the accomapnying drawings, which show the preferred embodiment of the invention, and pointed out in the claims hereunto appended.

In the accompanying drawings:

Figure 1 is a side view of the slicer constructed in accordance with the invention.

Figure 2 is an enlarged top plan view thereof.

Figure 3 is a cross-sectional view through the vegetable rack with the slicer blade frame in association therewith, and both in a horizontal plane.

Figure 4 is a top plan view showing the slicer blade frame straddling the vegetable rack for slab slicing operation.

Figure 5 is an end elevation thereof.

Similar reference characters indicate corresponding parts throughout the several views in the drawings.

Referring to the drawings, the slicer denoted generally at A comprises a base stand 10 having rising therefrom centrally of the same a substantially V-shaped rack with the side panels 11 thereof reversely angled to the vertical with respect to each other and an intermediate flat gutter bed 12 at the bottom of the rack, the said bed being in a plane with the base stand 10. The rack is adapted to receive therein a whole vegetable, such as a potato B to be sliced, either into strips or cube formations.

These panels 11 at one end of the V-shaped rack formation thereof have outwardly spaced round stationary pivot or pintle bars 13, each being spaced by connecting unions 14 with an attaching plate 15 secured by fasteners 16 to the panel 11 next thereto. The bars 13 are parallel with the plates 15, which follow the end edges of the panels 11 for the major extent thereof.

Adapted for interchangeable hinging either of these bars 13 is a detachable bladed slicer frame 17 having the cutting blades 18 arranged in spaced parallel relation to each other and secured at their ends in opposite coupling tube parts 19 of the slicer frame, each part 19 being fitted with a fastener 20 engaged therein for securing the ends of the blades within such parts.

For hinging the slicer frame 17 to one of the bars 13, one of the parts 19 has fixed thereto a hook hinge leaf 21 which hooks under the bar 13 for the vertical swinging of the frame 17 from one end thereof toward and away from the panel 11 at either side of the rack, so that a vegetable therein can be conveniently sliced on manipulation of the said frame 17.

The other part 19 of the frame 17 is fitted with a handle 22 for hand manipulation of the said frame in the slicing operation of the same. In Figures 1, 2 and 3 of the drawings the frame 17 is shown hooked to one of the bars 13 for the hinged connection of this frame with one of the panels 11 of the rack.

The panels 11 are formed with aligned slots 23 which extend entirely through the said panels in spaced parallel relation to each other and such slots are of a size to accommodate the blades 18 of the frame 17 when the latter is entirely detached from a panel 11 and arranged horizontally in interfitting relation to said slots 23 as shown in Figures 4 and 5 of the drawings, for cross-cutting of a vegetable seated in the crotch of the rack, the vegetable being indicated at 24 in Figure 5. By interchanging the position of the frame 17 in the several instances as before set forth the vegetable can be sliced lengthwise and crosswise thereof, for the cutting of the vegetable into strips or in cube formations. The frame 17 when placed in the horizontal position as shown in Figures 4 and 5 of the drawings will be held in the hands of a user and forced down through the rack and the vegetable for the slicing of the latter crosswise of the same, while in Figures 1, 2 and 3 the vegetable is placed as shown in said Figure 3 with the frame 17 hooked to a panel 11 to have the vegetable sliced lengthwise thereof.

What is claimed is:

1. A slicer of the kind described, comprising a substantially V-shaped rack having side-panels provided with aligned spaced parallel slots opening through the outermost free edges of such panels, hinge means extending along the side and at the end of each of the panels, a bladed slicer frame and means on one end of the frame for a detachable connection with either of said hinge means whereby the frame may be swung into the V-shaped rack and in a direction of right angles to the slots therein.

2. The invention as in claim 1 wherein the panels are reversely angled to the vertical with respect to each other, and a base is provided for mounting said rack thereon at the apex thereof, and an intermediate flat gutter bed is provided at the bottom of the rack in a plane with said base.

PAUL BAKER WITMER.